(12) United States Patent
Beloussov et al.

(10) Patent No.: US 11,579,985 B2
(45) Date of Patent: Feb. 14, 2023

(54) SYSTEM AND METHOD OF PREVENTING MALWARE REOCCURRENCE WHEN RESTORING A COMPUTING DEVICE USING A BACKUP IMAGE

(71) Applicant: Acronis International GmbH, Schaffhausen (CH)

(72) Inventors: Serguei Beloussov, Costa del Sol (SG); Oleg Ishanov, Moscow (RU); Vladimir Strogov, Moscow (RU); Andrey Kulaga, Moscow (RU); Igor Kornachev, Moscow (RU); Alexey Sergeev, Moscow (RU); Anton Enakiev, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 171 days.

(21) Appl. No.: 16/889,184

(22) Filed: Jun. 1, 2020

(65) Prior Publication Data
US 2020/0379853 A1 Dec. 3, 2020

Related U.S. Application Data

(60) Provisional application No. 62/855,019, filed on May 31, 2019.

(51) Int. Cl.
*G06F 21/56* (2013.01)
*G06F 8/65* (2018.01)
(Continued)

(52) U.S. Cl.
CPC ............ *G06F 11/1469* (2013.01); *G06F 8/65* (2013.01); *G06F 8/71* (2013.01); *G06F 11/1464* (2013.01);
(Continued)

(58) Field of Classification Search
CPC ............ G06F 11/1451; G06F 11/1464; G06F 11/1469; G06F 21/568; G06F 2201/84; G06F 8/65; G06F 8/71; H04L 63/1433
See application file for complete search history.

(56) References Cited

U.S. PATENT DOCUMENTS 8,856,774 B1 * 10/2014 Kulaga .................. G06F 21/57
717/168
9,535,685 B1 * 1/2017 Wang ........................ G06F 8/61
(Continued)

OTHER PUBLICATIONS

Hoffman, Chris. "How to Use Safe Mode to Fix Your Windows PC (and When You Should)", Mar. 2019. Retrieved from <https://www.howtogeek.com/164876/how-to-use-safe-mode-to-fix-your-windows-pc-and-when-you-should/>. (Year: 2019).*
(Continued)

*Primary Examiner* — Michael Simitoski
(74) *Attorney, Agent, or Firm* — ArentFox Schiff LLP; Michael Fainberg

(57) ABSTRACT

Disclosed herein are systems and method for preventing malware reoccurrence when restoring a computing device using a backup image. In one exemplary aspect, a method may identify, from a plurality of backup images for a computing device, a backup image that was created most recently before the computing device was compromised. The method may mount the backup image as a disk and scanning the disk for malicious software. The method may disable all ports and services on the computing device to prevent unauthorized network connections and service launches. The method may restore data to the computing device from the mounted disk. The method may update software on the computing device and applying latest patches, and reopen the ports and restart the services on the computing device subsequent to updating the software and applying the latest patches.

17 Claims, 7 Drawing Sheets

(51) Int. Cl.
  *G06F 8/71* (2018.01)
  *G06F 11/14* (2006.01)
(52) U.S. Cl.
  CPC ........ *G06F 21/568* (2013.01); *G06F 2201/84* (2013.01)

(56) References Cited

U.S. PATENT DOCUMENTS

| | | | | |
|---|---|---|---|---|
| 11,144,233 B1* | 10/2021 | Singhal | .............. | G06F 3/0619 |
| 2003/0106051 A1* | 6/2003 | Morrison | .............. | G06F 8/65 |
| | | | | 717/170 |
| 2005/0198110 A1* | 9/2005 | Garms | .............. | H04L 63/1433 |
| | | | | 713/188 |
| 2005/0273857 A1* | 12/2005 | Freund | .............. | H04L 63/1425 |
| | | | | 726/23 |
| 2006/0080656 A1* | 4/2006 | Cain | .............. | G06F 8/65 |
| | | | | 434/118 |
| 2009/0013409 A1* | 1/2009 | Wenzinger | .............. | G06F 21/575 |
| | | | | 726/24 |
| 2011/0078497 A1* | 3/2011 | Lyne | .............. | G06F 21/568 |
| | | | | 714/15 |
| 2012/0072989 A1* | 3/2012 | Sakai | .............. | G06F 21/567 |
| | | | | 726/24 |
| 2014/0032449 A1* | 1/2014 | Kacin | .............. | H04L 41/0883 |
| | | | | 707/741 |
| 2014/0188986 A1* | 7/2014 | Levy | .............. | G06F 21/565 |
| | | | | 709/203 |
| 2014/0325498 A1* | 10/2014 | Sirois | .............. | G06F 8/65 |
| | | | | 717/170 |
| 2016/0055337 A1* | 2/2016 | El-Moussa | .............. | G06F 21/566 |
| | | | | 726/23 |
| 2016/0092189 A1* | 3/2016 | Pollack | .............. | G06F 9/546 |
| | | | | 717/175 |
| 2016/0337169 A1* | 11/2016 | Chhabra | .............. | H04L 45/22 |
| 2017/0111388 A1* | 4/2017 | Mehta | .............. | G06F 21/56 |
| 2019/0140835 A1* | 5/2019 | Moen | .............. | G06F 21/577 |
| 2019/0196805 A1* | 6/2019 | Lee | .............. | G06F 21/6209 |
| 2019/0311430 A1* | 10/2019 | Raleigh | .............. | H04M 15/68 |
| 2020/0065487 A1* | 2/2020 | Timashev | .............. | G06F 21/561 |
| 2021/0044612 A1* | 2/2021 | Kawauchi | .............. | H04W 12/122 |
| 2022/0004465 A1* | 1/2022 | Huntley | .............. | G06F 11/1469 |

OTHER PUBLICATIONS

HP. "HP PCs—Using Microsoft System Restore (Windows 7)", 2017. Retrieved from <https://web.archive.org/web/20170326145508/http://support.hp.com/us-en/document/c01835735>. (Year: 2017).*

S. Treetippayaruk and T. Senivongse, "Security vulnerability assessment for software version upgrade," 2017 18th IEEE/ACIS International Conference on Software Engineering, Artificial Intelligence, Networking and Parallel/Distributed Computing (SNPD), 2017, pp. 283-289, doi: 10.1109/SNPD.2017.8022734. (Year: 2017).*

* cited by examiner

SYSTEM AND METHOD OF PREVENTING MALWARE REOCCURRENCE WHEN RESTORING A COMPUTING DEVICE USING A BACKUP IMAGE

CROSS-REFERENCE TO RELATED APPLICATIONS

This application claims the benefit of U.S. Provisional Application No. 62/855,019, filed May 31, 2019, which is herein incorporated by reference.

FIELD OF TECHNOLOGY

The present disclosure relates generally to the field of data restoration, and more specifically, to systems and method of preventing malware reoccurrence when restoring a computing device using a backup image.

BACKGROUND

Anti-virus software can generally detect an infection of a system, and remove or remediate all the infected data. In order to restore the data, however, the antivirus software must ensure that the restored data is extracted from the backup copy that was made just prior to the occurrence of the malicious software attack. For safe remediation, "clean" and trustworthy backups must be identified in the chain of regular user backups, and this clean backup must not be affected by the malware attack. After a computer system has been cleaned from viruses/malware, the vulnerability may persist because the necessary operating system updates were not made earlier. Because of this, immediate re-infection is possible and must be avoided.

Concurrently, data that has been changed or added since this backup was created must also be restored in order to minimize data loss. Therefore, the antivirus software and backup software must work together to find a backup that was created at a time closest to the moment when the malware attack was detected. This ensures that the system restores the latest copy of the data that is not infected by a virus and other malicious software.

Data changes often in large organizations and companies, thus significantly complicating this problem. Furthermore, the number of backups is quite large because hundreds or thousands of servers have their data backed up often. Even one or two days of difference between the backup and the attack can significantly affect the relevance of data files, documents, databases and the like.

SUMMARY

To address these needs and the shortcomings listed above, aspects of the disclosure describe methods and systems for preventing malware reoccurrence when restoring a computing device using a backup image. In one exemplary aspect, a method may identify, from a plurality of backup images for a computing device, a backup image that was created most recently before the computing device was compromised (e.g., infected by malware, experienced unauthorized access, subjected to a hacker attack, etc.). The method may mount the backup image as a disk and scanning the disk for malicious software. The method may disable all ports and services on the computing device to prevent unauthorized network connections and service launches. The method may restore data to the computing device from the mounted disk. The method may update software on the computing device and applying latest patches, and reopen the ports and restart the services on the computing device subsequent to updating the software and applying the latest patches.

In some aspects, updating software on the computing device and applying latest patches further comprises identifying a security issue that caused the computing device to be compromised, determining whether a patch that resolves the security issue exists, and in response to determining that the patch exists, installing the patch.

In some aspects, updating software on the computing device and applying latest patches further comprises identifying an application that became infected and caused the computing device to be compromised, wherein a version of the application installed on the computing device is outdated and a new version of the application is available. A method may determine whether the new version comprises known security issues that are unresolved, and in response to determining that the new version does not comprise known security issues that are unresolved, the method may update the application from the outdated version to the new version.

In some aspects, in response to determining that the new version comprises the known security issues that are unresolved, the method may delay updating the application to the new version until the known security issues are resolved.

In some aspects, the method may restart the computing device subsequent to restoring the data.

In some aspects, disabling the ports comprises either blocking or closing a portion of the ports from establishing the unauthorized network connections.

In some aspects, disabling the services comprises suspending or stopping a portion of the services and system processes.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of preventing malware reoccurrence when restoring a computing device using a backup image. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
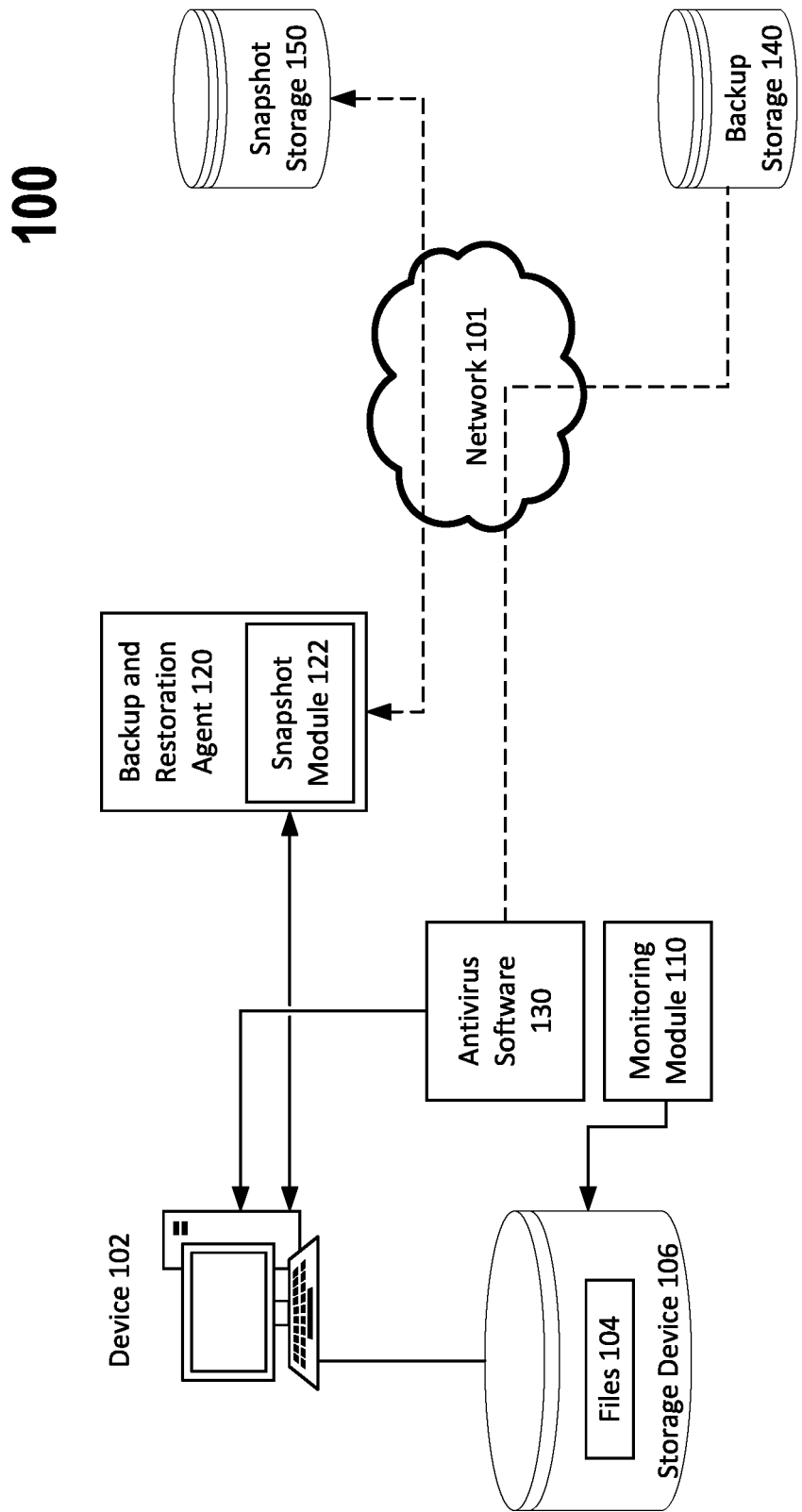
FIG. 1 is a block diagram illustrating a system of restoring a clean backup after a malware attack in accordance with exemplary aspects of the present disclosure.

FIG. 1 is a block diagram illustrating a system 100 of restoring a clean backup after a malware attack, in accordance with exemplary aspects of the present disclosure.

In exemplary aspects, the system 100 comprises a computing device 102 with one or more files 104 stored on storage devices 106. The system 100 further comprises a monitoring module 110, a backup and restoration agent 120 (BR agent 120) and antivirus software 130. In exemplary aspects, the system 100 also comprises backup storage 140 and snapshot storage 150.

In exemplary aspects, the system 100 provides the discovery of a clean restoration point (i.e., backup), after a malware attack is detected. When malware attacks a computer, e.g., computing device 102, the malware may spread to other devices on the network 101. Therefore, the system 100 quickly identifies the file or files that may have caused the malware attack on the computing device 102, and reverts the computing device 102 back to a clean restoration point or state prior to the malware attack. The system 100 can then apply system and application patches so that the patches are not infected by malware and can function properly without reinfection of the system.

The computing device 102 may be a server, a workstation, a mobile device such as a smartphone, tablet or the like that is intended to be restored in case a disaster recovery is needed. The computing device may have a backup agent (e.g., BR agent 120) installed on each critical computing device, e.g., device 10, and may also include the backup agent on other non-critical devices.

The monitoring module 110 monitors the files 104 on the one or more storage devices 106 that are of a particular file type, for example, executable files, files containing macros, or the like, and adding these files to a list. These files require constant monitoring. In some exemplary aspects, the monitoring module 110 is installed on the computing device 102, or executes as a service over network 101 and communicates with a process on the computing device 102 to monitor files on the device of the particular type. As files are added to the one or more storage devices 106, the monitoring module may determine whether the files are of the specified type (e.g., executables or containing macros, etc.) and add them to the list. According to exemplary aspects, the monitoring module 110 may be implemented as filter driver(s) to generate the list of files, or in some aspects using components or built-in tools of an operating system of the computing device 102. In one example, components of the operating system may include Update Sequence Number (USN) Journal of Windows NTFS, though other components and functionality are also contemplated.

The backup and restoration (BR) agent 120 is configured to backup user data on device 102 according to, for example a predetermined schedule, though on-demand backups are also contemplated. The BR agent 120 backs up data (e.g., files 104) from the storage device 106 to backup files and stores the backup files in backup storage 140. In some embodiments, the backup files may also be stored locally, for example on storage device 106. The BR agent 120 may, in some aspects, generate backup slices that are incremental updates to a particular backup. In exemplary aspects, a backup slice is the contents of a backup at a specific point in time. Generally, a slice contains the data that has changed since the last backup, and the slice uses unchanged data from the previous slices or from the initial (primary) backup. So, in order to restore all the data we need an entire chain of slices (full backup and all the incremental backups), in exemplary aspects of the present disclosure. In this aspect, once the backup is "complete" in that the final slice has been added, then the BR agent 120 stores the entire backup to the backup storage 140. In an alternative aspect, the BR agent 120 stores each slice in the backup storage 140 as the slice is generated. These snapshots can be monitored for changes in objects (such as files) contained in the snapshots, to detect possible malware or virus attacks.

The BR agent 120 may further comprise a snapshot module 122. The snapshot module 122 is configured to take file system snapshots of the computing device 102, where each snapshot reflects the instantaneous stage of a system (e.g., device 102) at one time or another. In exemplary aspects, the snapshots contain status of files that are monitored by the monitoring module 110, e.g., those files defined in the list formed by monitoring module 110. In one example, the information stored for each file includes file name, path (address, offset), size, creation date and time, modifications, access logs to the file and the like. Each snapshot may be stored locally, but in exemplary aspects are stored in snapshot storage 150. In some aspects, the snapshots may also be stored on the backup storage 140. When the BR agent 120 creates a backup for computing device 10, the history of snapshots is simultaneously stored in storage. In exemplary aspects, the snapshots correlate with one or another backup or slices within the backups in backup storage 140.

The BR agent 120 is either software installed on each device 102, or a service that operates on each device 102, either through a client/server process or the like. The BR 120 performs backup and restore operations to the various critical workstations and other computing devices in system 100 across network 101. The BR agent 120 may use or invoke various services and components across the system 100 to perform the backup and restore operations.

Antivirus software 130 detects and disables virus attacks that occur across the network 101 at the computing device 102 and/or other servers and workstations. In exemplary aspects, the antivirus software 130 is installed on each device or workstation. In other aspects, the antivirus software 130 is available as a service in system 100 that performs antivirus tasks one each computing device in the form of a client/server process or the like, though other configurations are also contemplated. Once the antivirus software 130 has detected that a virus attack has begun (data infection for instance), the sources of the attack and the list of files and/or components that are carries of the infection or threat are analyzed for further information regarding the attack. As a result of this analysis, the antivirus software 130 creates or generates a list of dangerous objects that have been recognized to spread the virus or malware. In exemplary aspects, the dangerous objects may include files, processes, macros or the like. The antivirus software 130 may use the snapshot history along with stored backups to determine which backup does not contain the dangerous objects. Accordingly, such a backup would be safe, and the computing device 102 (e.g., the data of the device) may be rolled back to a given restore point. Additionally, hash sums can be used to track modifications of the files across the history of snapshots by calculating the hash sum of the file as stored in each snapshot.

The antivirus software 130 retrieves the history of snapshots stored in snapshot storage 150. Each snapshot is verified sequentially from the very latest snapshot to the earliest taken snapshot. For example, if there are 100 snapshots, and the infection occurred in the fiftieth snapshot, the antivirus software 130 discovers an infection in the latest snapshot. The system 100 retrieves the previous (51st) snapshot that contains the most recent uninfected data. Accordingly, in some aspects, the system 100 uses the first infected snapshot and the last non-infected snapshot. The dangerous files are then compared to the files in the history of snapshots, for example, the last one hundred snapshots. In other exemplary aspects, any portion of the snapshots can be used for comparison, as predetermined by an administrator of system 100, or alternatively, the number of snapshots used is learned using machine learning and artificial intelligence. By comparing the dangerous objects with the snapshots, the antivirus software 130 may determine when exactly the attack began by identifying which snapshot first contains the dangerous objects, or which snapshot first contains modifications to the hash sum of each file in the list of files generated by the monitoring module 110. Once the snapshot is identified that contains the earliest indication of when an attack began, the antivirus software 130 identifies the nearest backup before the data was affected by the virus or malware, e.g., backup 3 in FIG. 2. In exemplary aspects, a list of selected files which are planned to be monitored are created by monitoring module 110. The snapshot stores information about changes of these files: whether the files were changed or not, and when they were changed. This list is defined after analyzing an attack. Those objects (e.g., files) that are determined by analysis to sources of infection or may infect other objects or files are added to the list of monitored object.

Figure 2:
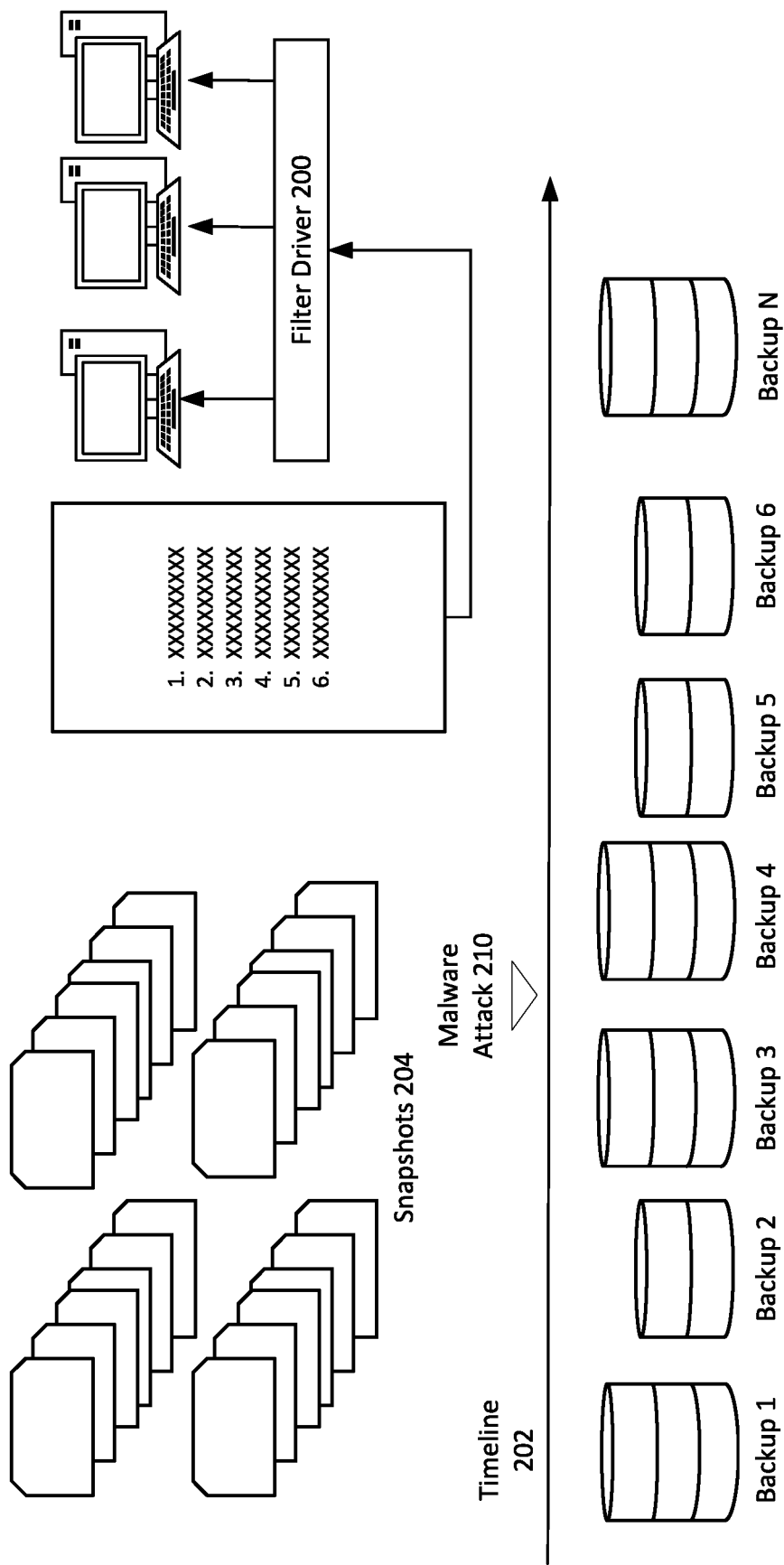
FIG. 2 illustrates a timeline of a malware attack on a system according to exemplary aspects of the disclosure, in accordance with exemplary aspects of the present disclosure.

The antivirus software 130 then invokes the BR agent 120 that recovers/restores the data from backup No. 3 shown in FIG. 2, that is a clean backup containing data of the computing device 102 that is not affected by the malware. In exemplary aspects, this data can be recovered using a set of operations.

In other exemplary aspects, the BR agent 120 may also mount any backup or slice from a backup as a virtual volume to perform additional anti-virus scanning. The mounted backup may also be used to search for infected or safe versions of data. This can prove particularly useful allowing an administrator of the system 100 to treat the backup or slice as an ordinary disk or volume, perform a search by standard system means, and the like. Generally archives are in vendor specific formats and specialized software must be used that can read the archive in a particular format. These archive can be encrypted, protected by password, access limited or the like. However, the system 100 can mount the backup or slice and avoids these previously described limitations.

FIG. 2 illustrates a timeline 202 of a malware attack 210 on a system, e.g. system 100, according to exemplary aspects of the disclosure.

In the timeline 202, prior to the malware attack 210, a list of files are generated by filter driver 200 (e.g., an implementation of the monitoring module 110). Each of the files is stored in the history of snapshots 204, so that information regarding these files is known prior to, during, and after any malware attacks. Meanwhile, the BR agent 120 will also be generating/creating each backup 1, 2, 3, 4, 5, 6 to N as time passes, even after the malware attack 210. The malware attack may not be identified until several backups after the initial attack itself have been generates. Thus, reverting data on computing device 102 to the most recently created backup may not work because the most recent backup may have been created after the malware attack, and thus may be infected (e.g., a dirty backup) and re-infect the computing device 102. Instead, antivirus software 130 determines the exact timing of the attack using the history of snapshots 204. Once the timing is identified, a clean backup prior to that time is discovered, e.g., backup 3. The BR agent 120 then restores the data on backup 3 to the computing device 102, putting the computing device 102 into a safe state prior to the malicious attack with the fore knowledge of the type of files, processes, or other dangerous objects that caused the attack.

Consider a scenario in which a user has installed various applications on computing device 102. These applications may include web browsers, media playback applications, photo editors, text editors, etc. Suppose that monitoring module 110 is configured to monitor web browsers (e.g., Google Chrome, Microsoft Edge, etc.). This is a simplistic example as monitoring module 110 may monitor a plurality of file types and applications. In some aspects, the user may manually indicate which files and applications or types of files and applications that monitoring module 110 should monitor. In this particular example, the user may recognize that web browsers are a common gateway for malware and viruses and request for their monitoring accordingly.

There are several types of computer viruses and malware that may infect or attack computing device 102 that are particularly associated with web browsers. These computer viruses include web scripting viruses, which exploit the code of web browsers and web pages, and browser hijackers, which overtake certain web browser functions and can redirect users to unintended websites. Malware attack 210 may represent a browser hijacker that has corrupted a web browser on computing device 102 and has also automatically installed various malicious plugins and applications into computing device 102 via the web browser. When backup 4 is generated, the corrupted web browser and the malicious plugins and applications will be included. The user may not immediately realize that computing device 102 has been infected and may continue to use the web browser. Because the web browser is corrupted, however, the user may inadvertently access unintended websites, furthering the infection of computing device 102 (e.g., via website pop-ups, automated tab creations to malicious websites, etc.). Thus, backup 5 may indicate feature additional malicious plugins/applications not present in backup 4.

Suppose that by the creation of backup N, antivirus software 130 is running on computing device 102 and several dangerous objects are found. These dangerous objects may be, for example, the corrupted web browser and a plurality of malicious plugins, scripts, applications, etc., that have entered computing device 102 via the browser hijacking virus. Backup 3 represents a clean backup, which means that the dangerous objects identified by antivirus software 130 are not present in the backup. To arrive at this backup in an efficient manner such that all of the backups from 1-N do not have to be scanned, in some aspects, antivirus software 130 may use the binary search algorithm. For example, if N is 100, antivirus software 130 may determine whether at least one of the dangerous objects is present in the snapshot associated with the halfway backup (e.g., N=50). In response to determining that it is, antivirus software 130 may scan the halfway snapshot between N=1 and N=50 (i.e., N=25). In response to determining that at least one dangerous object exists in that snapshot, antivirus software 130 may scan N=13, followed by N=6 and N=3, respectively. At N=6, antivirus software 130 may determine that dangerous objects still exist, but at N=3, antivirus software 130 may determine that none of the dangerous objects exist. From this point on, antivirus software 130 will attempt to find the most recent clean backup that should be restored. Accordingly, antivirus software 130 may determine whether dangerous objects exist in N=4 and N=5. In this particular case, in response to determining that at least one of the dangerous objects exists in N=4, antivirus software 130 may conclude that N=3 is the most recent clean backup.

Figure 3:
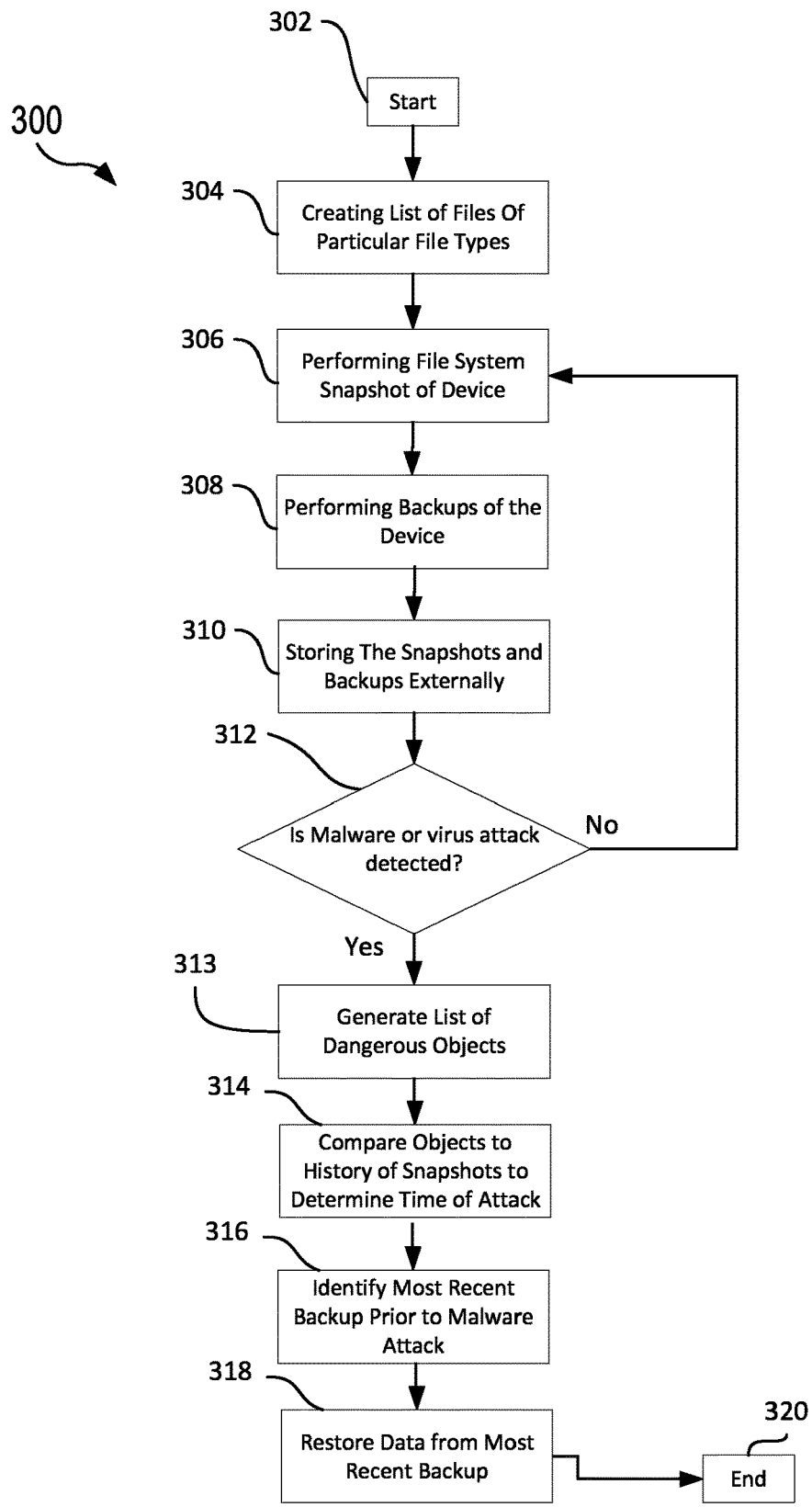
FIG. 3 is a flowchart illustrating a method of restoring a clean backup after a malware attack, in accordance with exemplary aspects of the present disclosure.

FIG. 3 is a flowchart illustrating a method 300 of restoring a clean backup after a malware attack, in accordance with exemplary aspects of the present disclosure.

The method begins at 302 and proceeds to 304.

At 304, the monitoring module 110 forms a list of files that are of a plurality of designated file types that can be infected by malicious software. These files may, for example, be files stored on a computing device such as computing device 102. The plurality of designated file types may include at least executable files and files containing macros. Additionally, the method 300 may detecting the addition of new files that are of the plurality of designated file types and add the new file to the list of files. In some aspects, the list is formed using one or more filter drivers. In alternative aspects, the list is formed using features of an operating system of the computing device. In one specific example, Update Sequence Number (USN) Journal. Of Windows NTFS may be used.

At 306, the backup agent 120 performs one or more file system snapshots of the computing device according to a predetermined schedule over a predetermined period of time. There may be a plurality of snapshots that show the history of these various files over a period of time, how these files have changed, when they were added to the computing device. Each snapshot may store information about each file, including the file data and metadata information such as creation time, editing time, hash sum, and any other information an administrator of the system may determine would be useful in restoring a safe backup.

The method proceeds to 308, where the backup agent 120 performs one or more backup according to a predetermined schedule of the computing device 102 over a period of time. For example, the backups may be taken every day, week or month, depending on criticality of the device 102, though other schedules and conditional schedules are also contemplated. These backups may be full and/or incremental backups that include backup "slices", adding to a single backup over time. Backups differ from snapshots in that the snapshots capture the system as it is at a particular point in time, while backups archive data stored on the device at a particular point in time, including writing anything in memory to disk, and the like.

At 310, the method 300 proceeds to storing the one or more snapshots simultaneously with the backup on external storage. In some aspects, the snapshots and backups are stored on the same external storage, on different external storage, a combination of both, in addition to different partitions of the external storage. In one aspect, snapshots correlate with one or more backups or with slices in a particular backup.

The method proceeds to 312, where antivirus software 130 determines that a malware attack is being carried out on the computing device and generates a list of dangerous objects that spread the malware attack at 313. In some aspects, the dangerous objects comprise files, processes and macros.

At 314, the BR agent 120 compares the list of dangerous objects with the one or more snapshots to determine when the malware attack occurred. In some aspects, the snapshot module 122 may track modifications to files in the list of files by comparing hash sums in the one or more snapshots over time to see if the hash sum has changed, indicating possible malware modification.

At 316, the BR agent 120 identifies a clean backup that was taken prior to the malware attack that is unaffected by the malware attack.

At 318, the BR agent 120 recovers data for the computing device from the clean backup. In some additional aspects, the method 300 may include mounting a backup or backup slice as a virtual volume on the computing device and performing anti-virus scanning on the virtual volume to determine whether the backup is safe. Additionally, the method 300 may search for infected or safe versions of data of the computing device on the virtual volume.

At 320, the method terminates.

Figure 4:
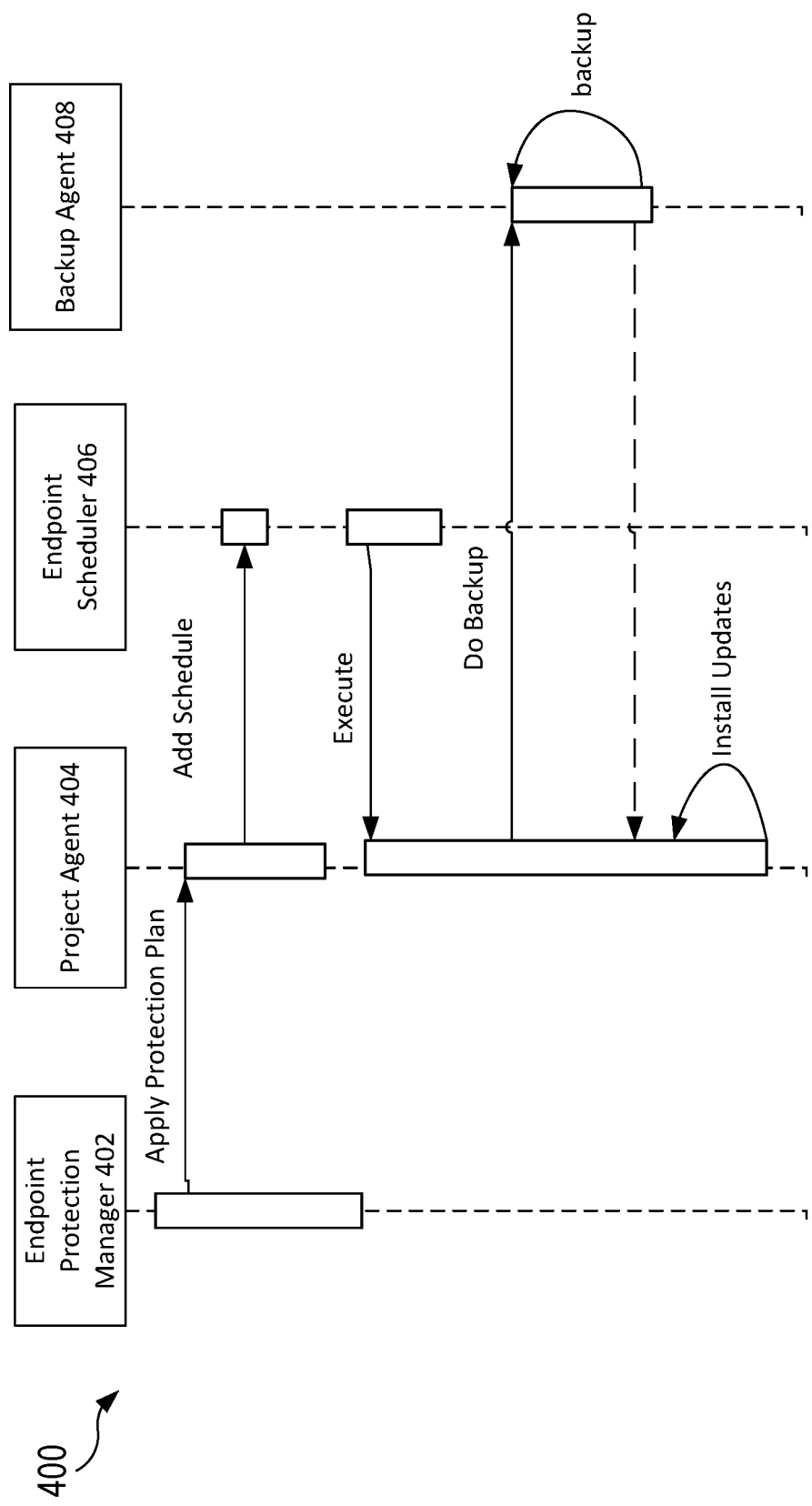
FIG. 4 is a sequence diagram illustrating a method of restoring a clean backup after a malware attack, in accordance with exemplary aspects of the present disclosure.

FIG. 4 is a sequence diagram 400 illustrating a method of restoring a restoring a clean backup after a malware attack, in accordance with exemplary aspects of the present disclosure.

According to exemplary aspects of the disclosure, the sequence diagram 400 is one exemplary implementation (for example, on Windows) of the system 100. The sequence diagram 400 begins when the endpoint protection manager 402 requests that a project agent 404 apply a particular protection plan to a computing device of an organization, for example computing device 102. The project agent 404 provides operational communication between various components of the system 100 to ensure data protection and recovery. The endpoint protection manager 402 may be a service that executes across system 100 via network 101, for example. Similarly, the project agent 404 is a component of the system 100.

The project agent 404 consequently adds a schedule to the endpoint scheduler 406 for performing a backup. The endpoint scheduler 406 schedules all backup operations in the system 100, and is also a service component of system 100. At a later point in time, the project Agent 404 initiates the backup by sending a command to do the backup to the backup agent 408 (e.g., the backup agent 120). The backup agent 408 then performs the backup and returns control to the project Agent 404. At this point, the project agent 404 is free to install further updates to the system.

Figure 5:
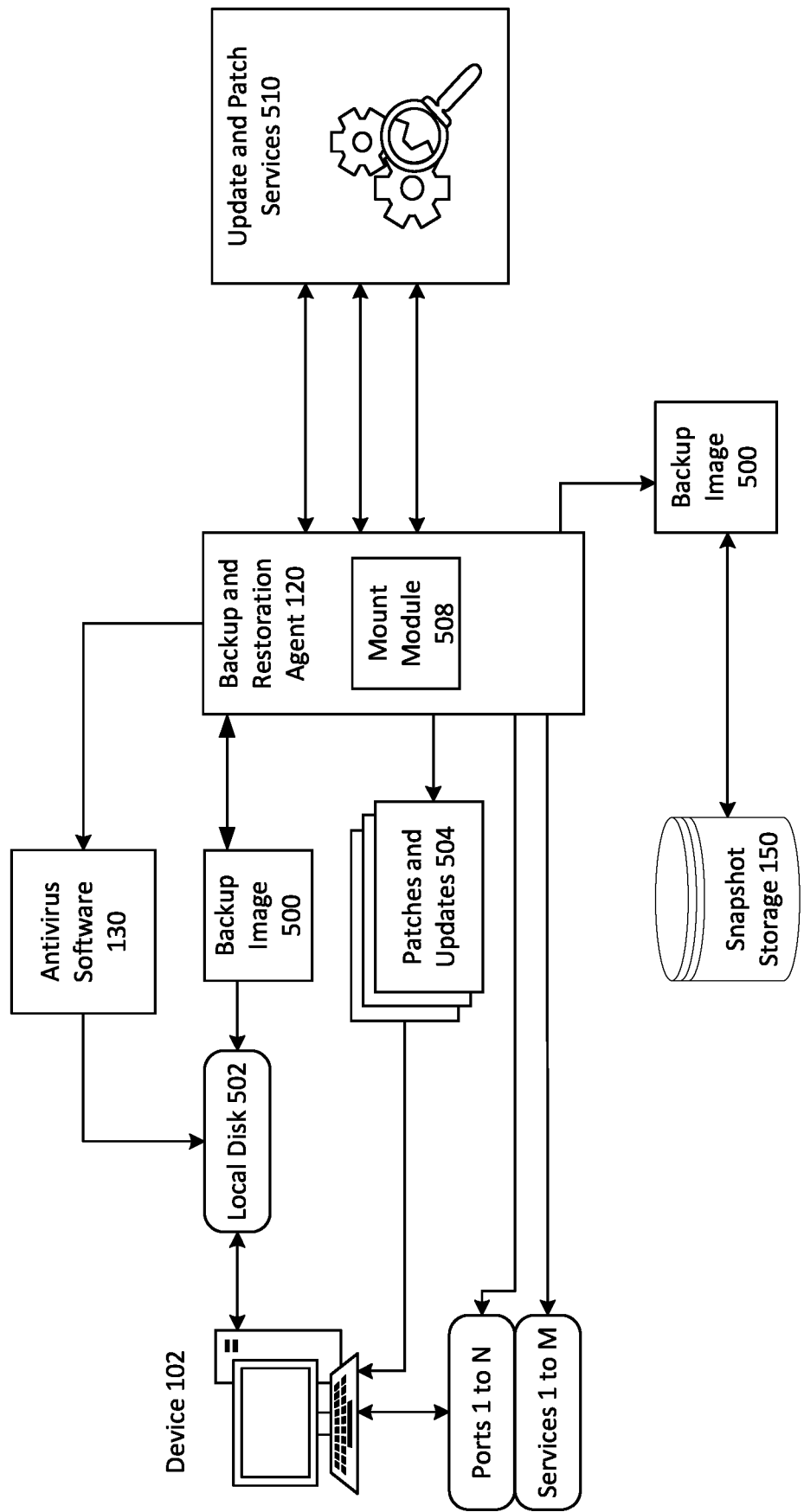
FIG. 5 is a block diagram illustrating components of system used to prevent malware reoccurrence when restoring a computing device using a backup image, in accordance with exemplary aspects of the present disclosure.

FIG. 5 is a block diagram illustrating system 100 of preventing malware reoccurrence when restoring a computing device using a backup image, in accordance with exemplary aspects of the present disclosure.

As described in FIGS. 1-3, a most recent backup image 500 is obtained from the snapshot storage 150. Additional measures may also be taken to prevent malware reoccurrence on the computing device 102 because the backup image 500 may contain vulnerabilities and infected files. Therefore using the backup image 500 without additional protection can lead to immediate reinfection, both from external sources and from infected files within a company infrastructure. Referring to FIG. 2, malware attack 210 occurs between backup 3 and backup 4. Accordingly, backup 3 is the most recent backup image (i.e., image 500). It should be noted, however, that backup 3 is a vulnerable image because it features a state of computing device 102 that was prone to malware attack 210. For example, malware attack 210 may have been caused due to a software bug or vulnerability in the operating system of computing device 102. In some aspects, the software bug or vulnerability may exist in an application installed on computing device 102.

When patches are generated for such bugs and vulnerabilities, there is a time period between when the patch/fix is released for installation by a developer and when the patch/fix is in fact installed on the computing device 102. In some cases, users push off the installation process, which leaves their devices prone to attacks. In particular, because developers list the pre-existing vulnerabilities that a given patch intends to fix, hackers and malware become aware and target those vulnerabilities. Furthermore, they attack devices that have yet to be updated.

Suppose that backup 3 comprises an outdated version of a web browser application that has a security flaw. Malware attack 210 may represent a browser hijacker that exploits the security flaw by corrupting the web browser on computing device 102 and installing various malicious plugins and applications into computing device 102 via the web browser. Although the web browser in backup 3 is not yet corrupt and the malicious plugins have not been installed in backup 3, if backup 3 were to be restored, the security flaw would continue to exist. If the user continues to use computing device 102 as he/she did before, the browser hijacker may once again re-infect the outdated web browser. As a result, there is a need to prevent the malware reoccurrence.

Accordingly, prior to restoring the backup image 500 (e.g., backup 3), backup and restoration agent 120 mounts the backup image 500 on as a physical or virtual disk on local disk 502 or memory of computing device 102. The backup image 500 is mounted as a physical or virtual disk image in order to avoid any concerns of the format of the backup image being incompatible with the system or backup software on the computing device 102. The advantage of mounting an image is that a physical or virtual disk can be scanned by any regular software or methods, whereas scanning an image without mounting requires a special backup program that created the image. This is due to the fact that each backup image may have its own specific format and may also be encrypted or password protected.

The backup and restoration agent 120 then instructs the antivirus software 130 to scan the newly mounted disk on local disk 502. The antivirus software 130 scans the entire contents of the backup image 500 by scanning the mounted disk, to ensure that no viruses, malicious software, or other harmful files/data are present in the backup image 500, or that such files have been quarantined. This adds an additional layer of protection when restoring backup files and, in some aspects, may also apply to backup files that are assumed to have occurred prior to a malware or virus attack overtaking a computing device. In exemplary aspects, the databases with virus and malware descriptions are updated prior to scanning. Furthermore, the antivirus software 130 (and/or any other anti-malware programs) is updated up to latest versions.

After the antivirus scan is completed by the antivirus software 130, the backup and restoration agent 120 closes all ports 1 to N on the computing device 102. In some cases, it may be possible that the antivirus software 130 failed to neutralize all malicious threats against the device 102. Therefore, the ports 1 to N are closed in case malicious software has passed through undetected in the virus scanning stage and attempts to make network connections to outside parties. Additionally, the backup and restoration agent 120 stops all services 1 to M and system processes that may be executing on the computing device 102. The services 1 to M and system processes may include FTP services or other services that can be vulnerable to malicious attacks. Therefore, stopping the services and system processes ensures that malicious software still remaining on the computing device 102 is neutralized.

After the virus scan is complete, and all ports have been closed and/or blocked and services have been suspended and/or stopped, the backup and restoration agent 120 issues a request to restart the computing device 102. In some aspects, after the computer restarts, the ports remain closed/blocked and services and system processes remain suspended/stopped to ensure that no new connections are made and/or no services are employed for malicious activity after the restart. The ports and processes will not be opened/resumed unless this is performed intentionally.

In exemplary aspects, after the computing device 102 has been restarted, the backup and restoration agent 120 forces an operating system and software update to bring the computing device 102 up to date. In this aspect, the backup and restoration agent 120 contacts an update and patch services 510 to receive updates and patches 504. These updates and patches 504 are applied to the computing device 102, specifically to the operating system and software installed on the computing device 102. The updates and patches 504 ensure that any security vulnerabilities that may still exist in the backup image 500 are addressed and removed. In some aspects, the computing device 102 communicates with updates and patches services 510 using a port dedicated to receiving updates and patches. As this port is dedicated to one purpose, a potential malicious entity on computing device 102 may be unable to have network access.

Subsequently, the ports 1 to N will be opened and/or unblocked and the services 1 to M will be restarted, and the likelihood that the computing devices 102 will have a malicious software reoccurrence is significantly reduced.

In some aspects, when identifying which patches are necessary for installation, the backup and restoration agent 120 may determine where the malware attack 210 entered the computing device 102. In particular, the backup and restoration agent 120 seeks to update the applications and operating system features that were targeted by the malware attack 210. These applications and operating system features may be tagged as prioritized updates. For example, if a web browser application was outdated at the time that backup image 500 was created and if the malware attack 210 was a browser hijacker, backup and restoration agent 120 may determine that a security patch is needed for the web browser application. The backup and restoration agent 120 may thus retrieve the security patch from update and patch services 510 (e.g., the developer of the web browser). In another example, if the firewall of the operating system of the computing device 102 was flawed and, as a result, a virus was able to enter the computing device 102, backup and restoration 120 may retrieve a firewall update from update and patch services 510 (e.g., the developer of the operating system).

This prevents resources and time from being wasted as the system does not busy itself with downloading and installing large patches for applications that are unrelated to malware attack 210. For example, if malware attack 210 may be prevented by installing a 10 MB web browser patch, the backup and restoration agent 120 may prioritize the installation of the browser patch over a generally benign video game update that is 1 GB in size. In some aspects, subsequent to installing the updates and patches that are tagged as prioritized updates, the backup and restoration agent 120 may open ports 1 to N and services 1 to M. After this opening, the user may begin to user the computing device 102 as he/she normally would and all other updates and patches that were not tagged as prioritized updates may be downloaded and installed in the background.

In some aspects, the backup and restoration agent 120 may identify an application that became infected and caused the computing device to be compromised. The version of the application installed on the computing device may be outdated and a new version of the application may be available. The backup and restoration agent 120 may determine whether the new version comprises known security issues that are unresolved. Of the known security issues may be a security issue that led to the infection. Likewise, there may be several other issues that may be highlighted by users in online forums or I.T. support logs (e.g., where users report bugs). In response to determining that the new version does not comprise known security issues that are unresolved, the backup and restoration agent 120 may update the application from the outdated version to the new version. For example, the new version may include a patch that fixes the specific security issue that led the application to be infected and may represent a stable build that has addressed at least a threshold number of reported security issues. Because of this, the new version is more appropriate to install onto computing device 102 in order to prevent reoccurrences of malware attacks that bogged the device 102 prior to being restored.

However, there may exist certain known security issues that have not been resolved and may in fact lead the new version to be more prone to malware attacks. For example, if the computing device 102 is a smartphone and the update involves installing a new version of an operating system, the new version may have several bugs that are still being resolved. Because of this, the backup and restoration agent 120 may delay the updating process until the new version has resolved its known security issues (particularly the security issue that led to the computing device 102 to be compromised).

Figure 6:
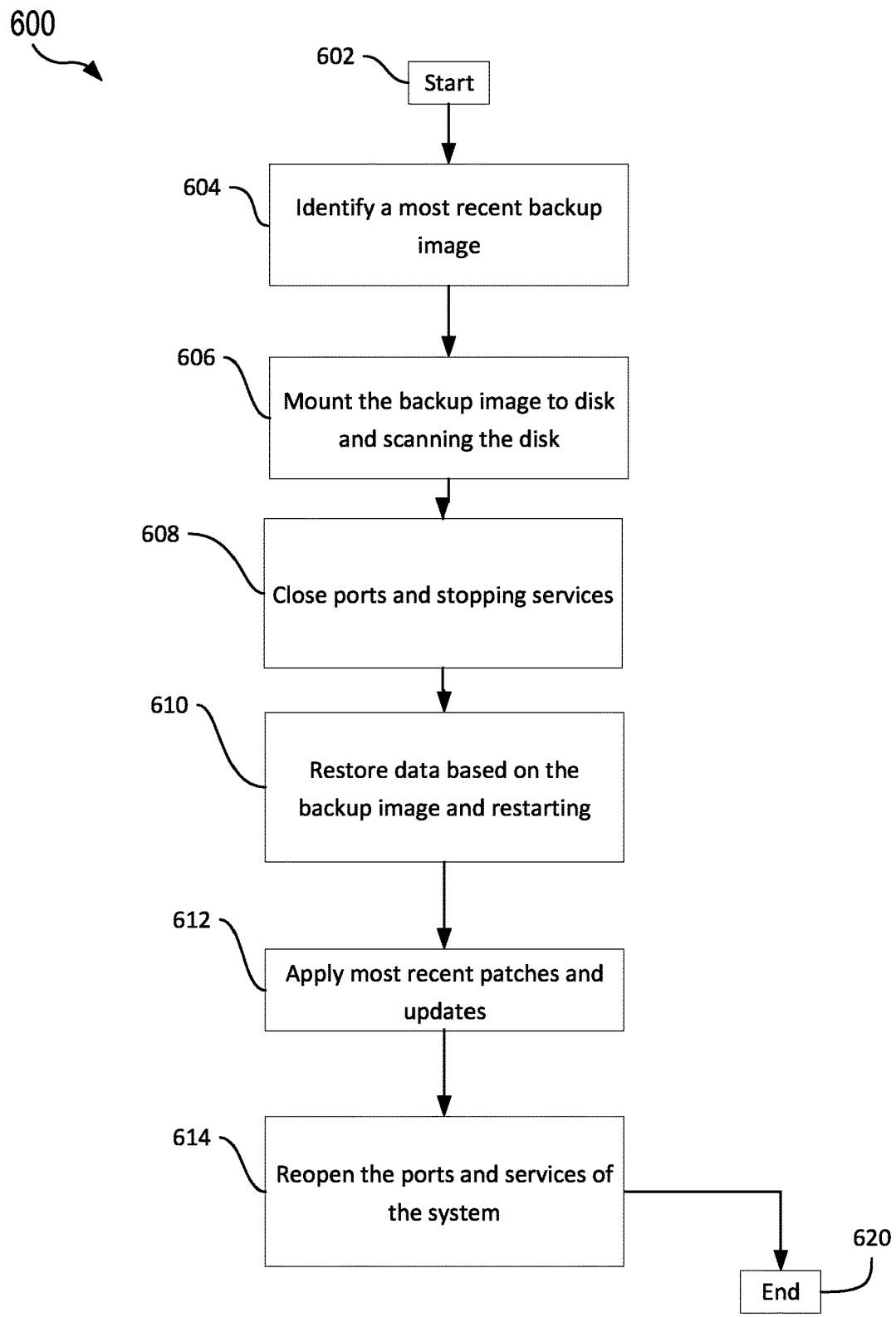
FIG. 6 is a flow diagram of a method of preventing malware reoccurrence after restoring a computing device using a backup image, in accordance with exemplary aspects of the present disclosure.

FIG. 6 is a flow diagram of a method of preventing malware reoccurrence after restoring a computing device using a backup image, in accordance with exemplary aspects of the present disclosure.

The method begins at 602 and proceeds to 604.

At 604, the backup and restoration agent 120 identifies, from a plurality of backup images for a computer system, a backup image that was created most recently before the computer system was compromised. In exemplary aspects, this is a clean backup that was taken most recently prior to a malware attack was detected. Ideally, this backup image should be clean from malware, but there may be remnants of infected files or dormant applications that may cause a reinfection of the computing device 102 to occur.

At 606, the mount module 508 mounts the backup image as a physical or virtual disk and the backup and restoration agent 120 then scans the disk for malicious software via the antivirus software 130. Ideally, the image is mounted as a disk so that the image can be scanned, circumventing format concerns of the backup image, any password protection, or the like. The mount module 508 avoids having to know the password, or the format of the backup image because the mount module 508 has appropriate access rights to the underlying data, i.e., user credentials, administrator rights, or the like. Typically, the mount module 508 is enabled with a standard access rights policy that allows for the mount module 508 to mount the image without concern for the encryption of the image or the like.

At 608, the backup and restoration agent 120 requests that the computing device close and/or block all ports and stop services and system processes on the computer device. In order to avoid immediate reinfection, these ports and services/processes are blocked/closed/suspended and/or stopped so that malicious software does not establish connections to off or onsite infrastructure to download malicious code or receive requests from malicious or virus software.

At 610, the backup and restoration agent 120 restores data to the computer system from the backup image and requests that the computing device 102 restart entirely. The computing device 102 is then restarted.

At 612, the backup and restoration agent 120 retrieves and applies the most recent patches and updates to the operating system and software on the computing device 102. It is common that vulnerabilities and software issues are updated immediately or very soon after they are discovered. Therefore applying the most recent patches and updates virtually ensures that reinfection will not occur.

At 614, the backup and restoration agent 120 requests that the computing device 102 open and/or unblock the ports and restart and/or resume the services and system processes on the computer system. Accordingly, the computing device 102 can function with a very high likelihood that it is malware free and the chance of reinfection has been significantly reduced.

The method terminates at 620.

Figure 7:
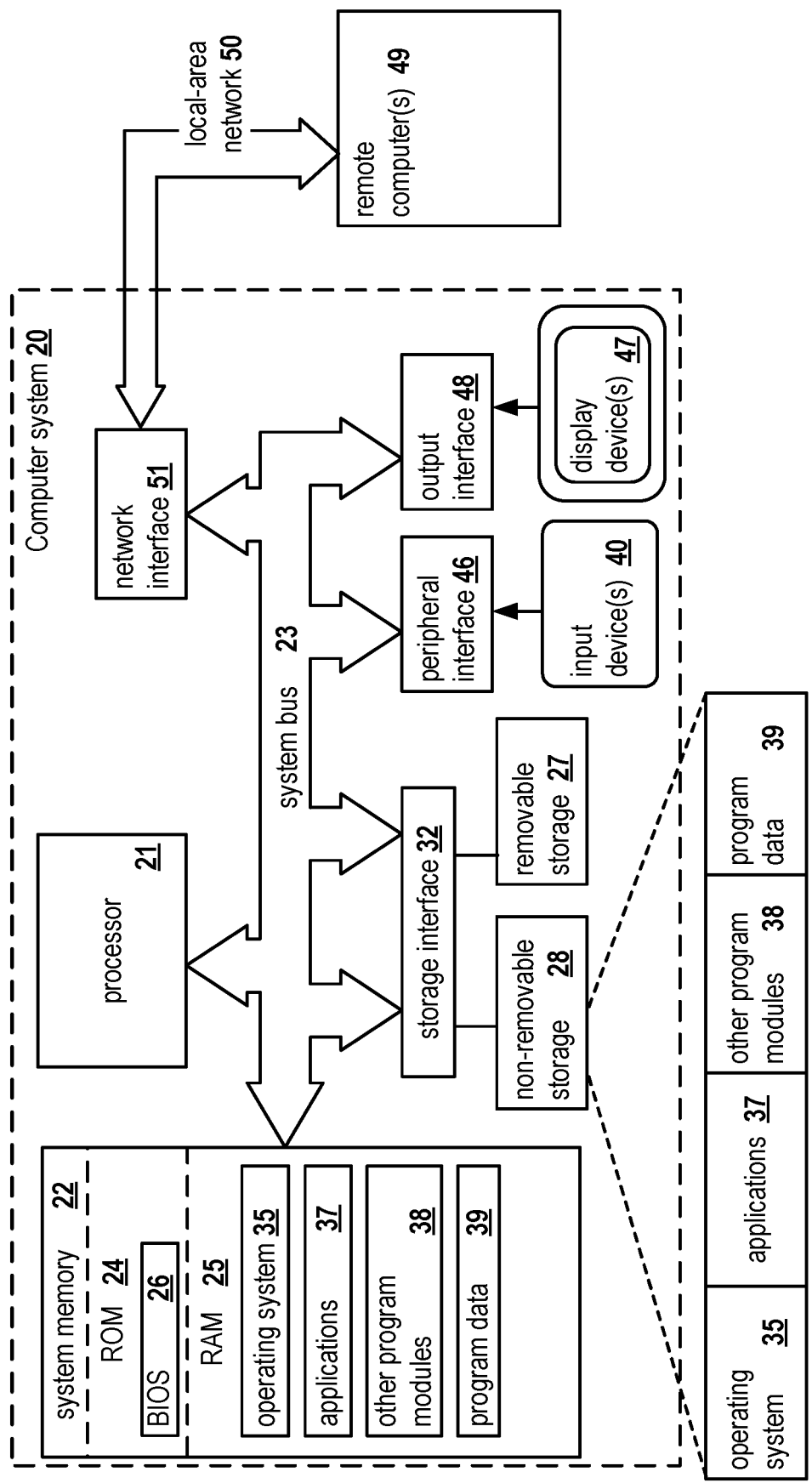
FIG. 7 is a block diagram of a computer system on which the disclosed system and method can be implemented according to an exemplary aspect.

FIG. 7 is a block diagram illustrating a computer system 20 on which aspects of systems and methods of preventing malware reoccurrence when restoring a computing device using a backup image may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of preventing malware reoccurrence when restoring a computing device using a backup image, comprising:
   identifying, from a plurality of backup images for a computing device, a backup image that was created most recently before the computing device was compromised;
   mounting the backup image as a disk and scanning the disk for malicious software;
   disabling all ports and services on the computing device to prevent unauthorized network connections and service launches;
   restoring data to the computing device from the mounted disk;
   updating software on the computing device and applying latest patches, wherein the software comprises a first version of an application that became infected and is a cause of the computing device being compromised, and wherein updating the software comprises:
      determining whether a new version of the application comprises a security issue that caused the application to become infected; and
      in response to determining that the new version comprises the security issue, delaying updating the application to the new version until the security issue is resolved in the new version; and
   reopening the ports and restarting the services on the computing device subsequent to updating the software and applying the latest patches.

2. The method of claim 1, wherein updating software on the computing device and applying latest patches further comprises:
   identifying a security issue that caused the computing device to be compromised;
   determining whether a patch that resolves the security issue exists; and
   in response to determining that the patch exists, installing the patch.

3. The method of claim 1, wherein updating software on the computing device and applying latest patches further comprises:
   determining whether the new version comprises known security issues that are unresolved; and
   in response to determining that the new version does not comprise known security issues that are unresolved, updating the application to the new version.

4. The method of claim 1, further comprising restarting the computing device subsequent to restoring the data.

5. The method of claim 1, wherein disabling the ports comprises either blocking or closing a portion of the ports from establishing the unauthorized network connections.

6. The method of claim 1, wherein disabling the services comprises suspending or stopping a portion of the services and system processes.

7. A system of preventing malware reoccurrence when restoring a computing device using a backup image, comprising:
   a hardware processor configured to:
      identify, from a plurality of backup images for a computing device, a backup image that was created most recently before the computing device was compromised;
      mount the backup image as a disk and scanning the disk for malicious software;
      disable all ports and services on the computing device to prevent unauthorized network connections and service launches;
      restore data to the computing device from the mounted disk;
      update software on the computing device and applying latest patches, wherein the software comprises a first version of an application that became infected and is a cause of the computing device being compromised, and wherein updating the software comprises:
         determining whether a new version of the application comprises a security issue that caused the application to become infected; and
         in response to determining that the new version comprises the security issue, delaying updating the application to the new version until the security issue is resolved in the new version; and reopen the ports and restarting the services on the computing device subsequent to updating the software and applying the latest patches.

8. The system of claim 7, wherein the hardware processor is configured to update software on the computing device and applying latest patches by:
   identifying a security issue that caused the computing device to be compromised;
   determining whether a patch that resolves the security issue exists; and
   in response to determining that the patch exists, installing the patch.

9. The system of claim 7, wherein the hardware processor is configured to updating software on the computing device and applying latest patches by:
   determining whether the new version comprises known security issues that are unresolved; and
   in response to determining that the new version does not comprise known security issues that are unresolved, updating the application to the new version.

10. The system of claim 7, wherein the hardware processor is configured to restart the computing device subsequent to restoring the data.

11. The system of claim 7, wherein the hardware processor is configured to disable the ports by either blocking or closing a portion of the ports from establishing the unauthorized network connections.

12. The system of claim 7, wherein the hardware processor is configured to disable the services by suspending or stopping a portion of the services and system processes.

13. A non-transitory computer readable medium storing thereon computer executable instructions for preventing malware reoccurrence when restoring a computing device using a backup image, including instructions for:
   identifying, from a plurality of backup images for a computing device, a backup image that was created most recently before the computing device was compromised;
   mounting the backup image as a disk and scanning the disk for malicious software;
   disabling all ports and services on the computing device to prevent unauthorized network connections and service launches;
   restoring data to the computing device from the mounted disk;
   updating software on the computing device and applying latest patches, wherein the software comprises a first version of an application that became infected and is a cause of the computing device being compromised, and wherein updating the software comprises:
      determining whether a new version of the application comprises a security issue that caused the application to become infected; and
      in response to determining that the new version comprises the security issue, delaying updating the application to the new version until the security issue is resolved in the new version; and
   reopening the ports and restarting the services on the computing device subsequent to updating the software and applying the latest patches.

14. The non-transitory computer readable medium of claim 13, wherein the instruction for updating software on the computing device and applying latest patches further comprises instructions for:
   identifying a security issue that caused the computing device to be compromised;
   determining whether a patch that resolves the security issue exists; and
   in response to determining that the patch exists, installing the patch.

15. The non-transitory computer readable medium of claim 13, wherein the instruction for updating software on the computing device and applying latest patches further comprises instructions for:
   determining whether the new version comprises known security issues that are unresolved; and
   in response to determining that the new version does not comprise known security issues that are unresolved, updating the application to the new version.

16. The non-transitory computer readable medium of claim 13, further comprising instructions for restarting the computing device subsequent to restoring the data.

17. The non-transitory computer readable medium of claim 13, wherein the instruction for disabling the ports comprises further instructions for either blocking or closing a portion of the ports from establishing the unauthorized network connections.

* * * * *